US010057796B2

(12) United States Patent
Elsherbini et al.

(10) Patent No.: US 10,057,796 B2
(45) Date of Patent: Aug. 21, 2018

(54) DUAL POLARIZED ANTENNA ARRAY

(71) Applicants: Adel A. Elsherbini, Chandler, AZ (US); Telesphor Kamgaing, Chandler, AZ (US); Pablo Herrero, Munich (DE); Bernhard Raaf, Neuried (DE)

(72) Inventors: Adel A. Elsherbini, Chandler, AZ (US); Telesphor Kamgaing, Chandler, AZ (US); Pablo Herrero, Munich (DE); Bernhard Raaf, Neuried (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/552,587

(22) Filed: Nov. 25, 2014

(65) Prior Publication Data

US 2016/0149315 A1    May 26, 2016

(51) Int. Cl.
*H04W 24/08*    (2009.01)
*H04B 7/04*    (2017.01)
*H01Q 1/24*    (2006.01)

(52) U.S. Cl.
CPC ............ *H04W 24/08* (2013.01); *H01Q 1/245* (2013.01); *H04B 7/04* (2013.01)

(58) Field of Classification Search
CPC combination set(s) only.
See application file for complete search history.

(56) References Cited

U.S. PATENT DOCUMENTS

| 6,700,865 | B1* | 3/2004 | Yamamoto | H04B 7/0811 370/203 |
|---|---|---|---|---|
| 2005/0057419 | A1* | 3/2005 | Pintos | H01Q 9/40 343/816 |
| 2005/0101252 | A1* | 5/2005 | Carvalho | H04B 7/0811 455/63.1 |
| 2006/0111056 | A1 | 5/2006 | Dutta | |
| 2007/0066361 | A1* | 3/2007 | Knudsen | H01Q 3/24 455/562.1 |
| 2008/0102814 | A1* | 5/2008 | Chari | H01Q 1/283 455/424 |
| 2008/0150799 | A1* | 6/2008 | Hemmi | H01Q 21/061 342/361 |
| 2009/0207093 | A1* | 8/2009 | Anreddy | H04B 7/04 343/876 |
| 2009/0295676 | A1* | 12/2009 | Yamazaki | H01Q 1/3233 343/876 |
| 2011/0105049 | A1* | 5/2011 | Yamada | H04B 7/0697 455/68 |

(Continued)

FOREIGN PATENT DOCUMENTS

| CN | 1595722 A | 3/2005 |
|---|---|---|
| CN | 103579781 A | 2/2014 |

(Continued)

OTHER PUBLICATIONS

Extended European Search Report received for European Patent Application No. 15191354.8, dated Mar. 17, 2016, 11 pages.
(Continued)

*Primary Examiner* — Junpeng Chen
(74) *Attorney, Agent, or Firm* — Schiff Hardin LLP

(57) ABSTRACT

Described herein are architectures, platforms and methods for implementing an antenna array with a dynamic polarization adjustment in a portable device.

22 Claims, 5 Drawing Sheets

(56) References Cited

U.S. PATENT DOCUMENTS

| | | | | |
|---|---|---|---|---|
| 2011/0237190 A1* | 9/2011 | Jolivet | ................ | H04B 5/0081 |
| | | | | 455/41.2 |
| 2011/0249576 A1* | 10/2011 | Chrisikos | ............... | H01Q 1/243 |
| | | | | 370/252 |
| 2012/0220238 A1* | 8/2012 | Hosoya | ................ | H04B 7/0695 |
| | | | | 455/63.4 |
| 2013/0072125 A1 | 3/2013 | Yoon et al. | | |
| 2013/0273870 A1 | 10/2013 | Shi | | |
| 2014/0003558 A1* | 1/2014 | Ichikawa | ................ | H04L 7/042 |
| | | | | 375/343 |
| 2014/0313924 A1* | 10/2014 | Zhang | ................... | H04B 7/082 |
| | | | | 370/252 |

FOREIGN PATENT DOCUMENTS

| EP | 2117078 A1 | 11/2009 |
| WO | WO 2014059661 A1 * | 4/2014 |

OTHER PUBLICATIONS

Office Action received for Taiwanese Patent Application No. 104134547, dated Jul. 26, 2016, 18 pages of Taiwanese Office Action including 10 Pages of English Translation.
Office Action received for Taiwan Patent Application No. 104134547, dated Jan. 24, 2017, 18 pages of Taiwan Office Action including 10 Pages of English Translation.
Search Report dated Nov. 25, 2017 for Chinese Application No. 2015106797996.
Office Action dated Jul. 19, 2017for European Patent Application No. 15191354.8.
Office Action dated May 22, 2018 for European Application No. 15191354.8.

* cited by examiner

DUAL POLARIZED ANTENNA ARRAY

BACKGROUND

An increasing number of wireless communication standards as applied to portable devices and a trend towards smaller, slimmer and lighter portable devices may cause major design challenges for antenna or antennas (hereinafter referred to as antenna in this document). The antenna represents a category of components that may fundamentally differ from other components in the portable device. For example, the antenna may be configured to efficiently radiate in free space, whereas the other components are more or less isolated from their surroundings.

Antennas operating at millimeter wave (mm-wave) frequencies—for high data rate short range links—are expected to gain popularity in the near future. One example of such an application or standard is called WiGig (Wireless Gigabit per Second), which operates at the ISM frequency band at around 60 GHz. In addition, utilization of the mm-wave radio systems is projected to play a role on future standards such as 5G cellular radio. Typically, these short range mm-wave radio systems require an unobstructed line-of-sight (LOS) between a transmitter and a receiving antenna for highest datarate at lowest power consumption. Such systems may also operate in non-line-of-sight (NLOS) configuration using signal reflection from surrounding objects. A goal of the WiGig standard is to enable NLOS transmission using wireless links. With the LOS requirement, an orientation of the transmitting and receiving antennas may require their respective main lobe to face each other for maximum radio link efficiency. Single element antenna designs such as those used in mobile devices such as laptop computers, tablets, smartphones, etc. are limited in coverage and further exhibit low gains at mm-wave operating frequencies.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for implementing an antenna array with dynamic polarization adjustment in an electronic device. For example, a first portable/stationary device establishes a wireless communication link with a second portable device through their respective antenna arrays. The antenna arrays may include interleaved horizontally and vertically polarized antenna elements. In certain applications of WiGig, wireless docketing may be implemented. In wireless docking, the portable device such as a laptop, tablet, or smartphone is docked to a stationary or fixed docking station.

After establishing a wireless communication link, the first portable device determines and compares wireless signal strengths between horizontally and vertically polarized antenna elements of its antenna array. Using an algorithm, such as gradient optimization algorithm, the first portable device derives a desired polarization that facilitates maximum power transfer in the antenna array. Thereafter, the first portable device may select at least one antenna element of its antenna array in response to the determining and comparing of the wireless signal strengths. The selected at least one antenna element may be used in transmitting or receiving wireless signals from the second portable device.

Figure 1:
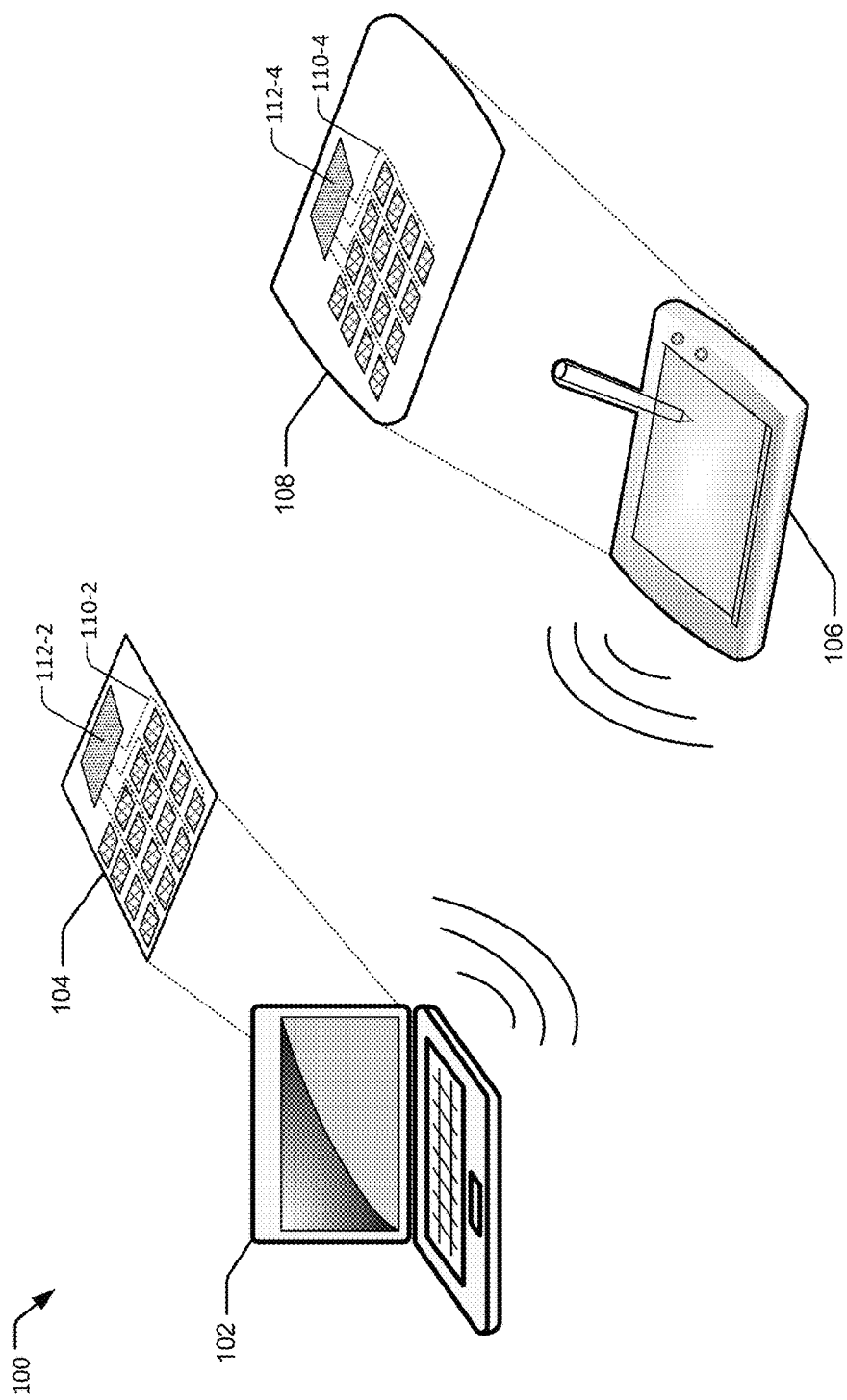
FIG. 1 is an example arrangement of portable devices during a line-of-sight (LOS) wireless communication.

FIG. 1 is an example arrangement 100 of portable devices during a line-of-sight (LOS) wireless communication. In certain implementations, the portable devices may operate at mm-wave frequencies. The arrangement 100 shows a portable device 102 with a blow-up illustration of its antenna 104, and another portable device 106 with an antenna 108. The arrangement 100 further illustrates waveguides or transmission lines 110 and a radio frequency (RF) module 112 for each of the antennas 104 and 108. In certain implementations for 60 GHz or mm-wave systems, the chip and antenna are on the same package substrate where the RF module 112 is a transceiver chip. Furthermore, switches may be all part of the same CMOS transceiver or package substrate.

The portable device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. The portable device 102, for example, may further communicate with the other portable device 106 in a network environment. The network environment, for example, includes a cellular network configured to facilitate communications between the portable device 102 and the other portable device 106.

For example, the portable device 102 may be an mm-wave portable device due to its feature or capability to operate at frequencies between 30 GHz and 300 GHz, otherwise known as millimeter or mm-wave frequencies. The portable device 102, for example, utilizes the antenna 104 when establishing and engaging in a LOS wireless communication with the other portable device 106. The LOS wireless communication, for example, is operating at frequency range 30-300 GHz where an obstruction in between the portable devices may easily reduce wireless signal strength during the LOS wireless communication. In the above example, the antenna 104 includes an antenna array that is composed of horizontally and vertically polarized antenna elements as further described in FIGS. 2 and 3.

In an implementation, the antenna 104 of the portable device 102 may utilize horizontal, vertical, or circular polarization during LOS wireless communications with the portable device 106. For example, the portable device 102 determines that a horizontal polarization provides maximum power transfer during the LOS wireless communication with the portable device 106. In this example, the horizontally polarized antenna elements of the antenna 104 are used by the portable device 102 for the LOS wireless communication. That is, the portable device 102 may deactivate or turn OFF the vertically polarized antenna elements of the antenna 104 for power savings and without affecting its efficiency in the transmission or reception of wireless signals.

In another example, the portable device 102 determines that a circular polarization provides the maximum power transfer when receiving the wireless signal from the portable device 106. In this example, the combination of the horizontally and the vertically polarized antenna elements of the antenna 104 may be used to provide circular polarization in the antenna radiation pattern of the antenna 104.

With continuing reference to FIG. 1, the portable device 102 may first establish LOS wireless communication link with the other portable device 106. Thereafter, the portable device 102 may detect and determine the polarization that facilitates maximum power transfer for the established LOS wireless communication. For example, the portable device 102 utilizes an algorithm such as gradient optimization algorithm to determine the polarization that provides the maximum power transfer. In this example, the portable device 102 may adjust its antenna 104 in accordance with the determined polarization that generates the maximum power transfer.

As an example of present implementations herein, other forms of detection such as a use of separate antennas within the portable device 102 may be utilized in determining the polarization that generates maximum power transfer. In this example, the determination of the wireless signal strength is based on an antenna other than the antenna 104.

In an implementation, the RF module 112, as a signal controller, facilitates transmission or reception of data in the form of wireless signals through the antenna 104. The RF module 112 may utilize the transmission lines 110 for the transmission and reception of the wireless signals. As shown, the transmission lines 110 couple each of the horizontally and vertically polarized antenna elements of the antenna 104 to a transceiver of the RF module 112.

Although the example arrangement 100 illustrates in a limited manner basic components of mm-wave wireless communications between the portable devices 102 and 106, other components such as battery, one or more processors, SIM card, etc. were not described in order to simplify the embodiments described herein. Furthermore, the NLOS wireless communication application may implement the same procedure or techniques as described for the LOS wireless communication application.

Figure 2:
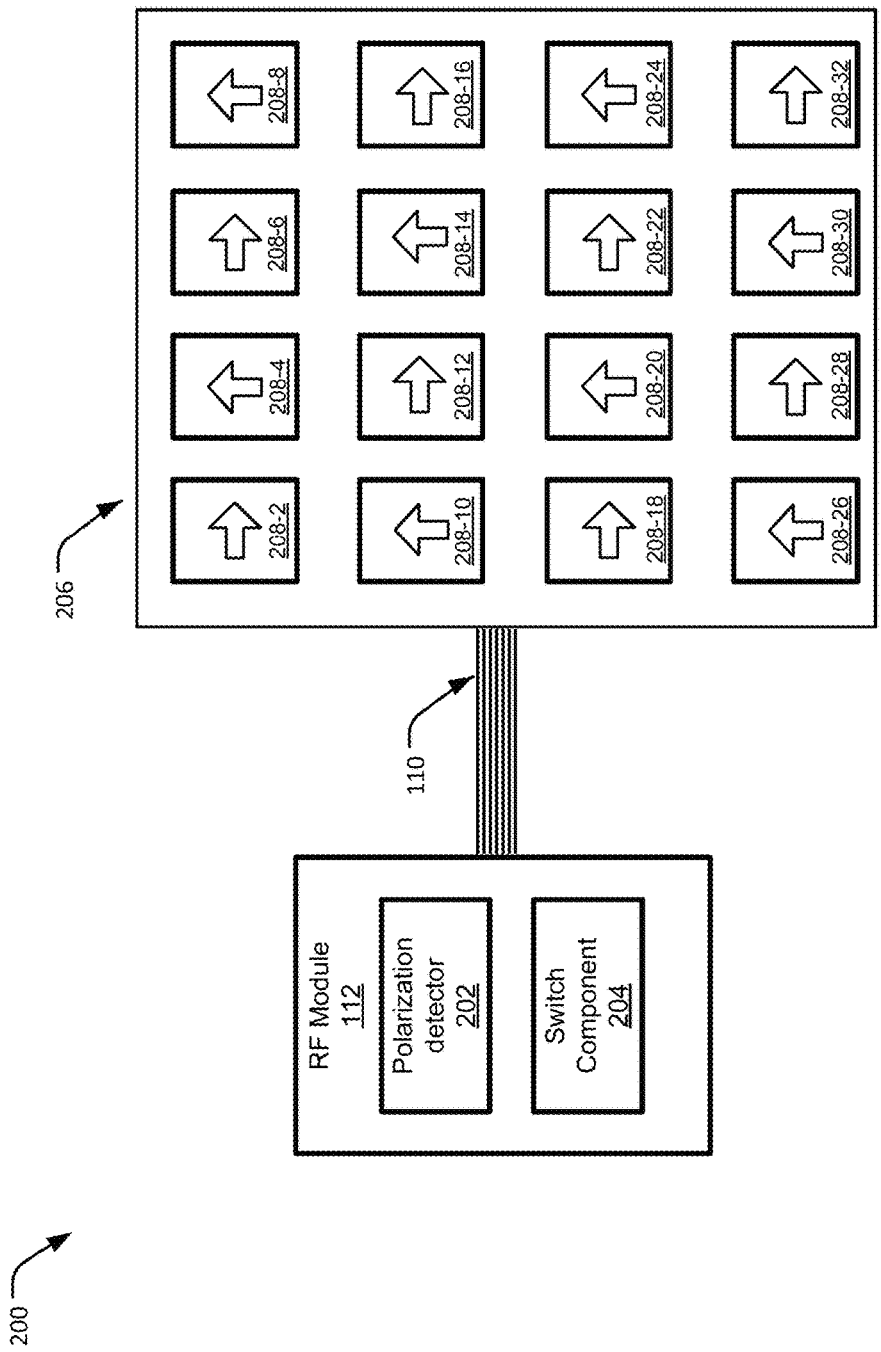
FIG. 2 is an example antenna configuration as described in present implementations herein.

FIG. 2 illustrates an example antenna 200 which is a representative antenna of the antennas 104 and 108 of the portable devices 102 and 106, respectively. In this example, the antenna 200 may be utilized as a receiver or a transmitter during the LOS (e.g., mm-wave) wireless communications. As shown, the antenna 200 includes the transmission lines 110, the RF module 112 that further includes a polarization detector 202 and switch components 204, and an antenna array 206 that includes antenna elements 208-2, 208-4, . . . , and 208-32.

As an example of present implementations herein, the portable device 102 utilizes the antenna 200 to establish wireless communications (e.g., mm-wave) with another portable device 106. For example, the portable device 102 transmits a request signal through the antenna 200 to establish the wireless communication (e.g., mm-wave) with the portable device 106. In this example, the antenna 200 includes the antenna array 206 with interleaved antenna elements 208 in order to operate at horizontal, vertical, or circular polarizations. The antenna array 206 may include a particular polarization-configuration based upon geometrical configuration or physical locations of the antenna elements 208.

For example, as shown, the antenna array 206 is a four by four (4×4) configuration that includes a first row composing of a horizontally polarized antenna element 208-2, a vertically polarized antenna element 208-4, another horizontally polarized antenna element 208-6, and another vertically polarized antenna element 208-8. The 4×4 antenna configuration further includes a second row composing of a vertically polarized antenna element 208-10, a horizontally polarized element 208-12, and so on. In this example, the 4×4 configuration includes the horizontally polarized antenna element (e.g., antenna element 208-12) that is surrounded by vertically polarized antenna elements in its four corners along x-y axis. For example, the antenna element 208-12 is surrounded by the vertically polarized antenna elements 208-2, 208-14, 208-20, and 208-10 at the top side, right side, bottom side, and left side, respectively, of the antenna element 208-12.

After the portable device 102 establishes the wireless communications (e.g., mm-wave) with the portable device 106, the antenna 200 of the portable device 102 may initially include a configuration where all of the antenna elements 208 of the antenna array 206 are at ON state. That is, the interleaved horizontally and vertically polarized antenna elements 208 are activated during the LOS wireless communication. At this configuration, the polarization detector 202 performs a determination and comparison of wireless signals strengths between the horizontally polarized and vertically polarized antenna elements 208.

For example, the polarization detector 202 is configured to measure and compare power signals in each of the horizontally and vertically polarized antenna elements 208. In this example, the polarization detector 202 utilizes the gradient optimization algorithm to derive the desired polarization for efficient LOS wireless communication by the portable device 102.

For example, if the polarization detector 202, using the gradient optimization algorithm, assumes that all horizontally polarized antenna elements 208 are receiving higher power signals as compared to the wireless signal strengths of the vertically polarized antenna elements 208, then the switch components 204 may be configured to turn OFF all vertically polarized antenna elements 208. That is, the horizontally polarized antenna elements 208 may remain activated. In this example, the polarization detector 202 may further utilize a power threshold that may provide a minimum power for which the polarization detector 202 may again perform the determination and comparison of the wireless signal strengths.

For example, in a case where the horizontally polarized antenna elements 208 remain activated and the vertically polarized antenna elements 208 are in OFF state, the received radiation power at the horizontally polarized antenna elements 208 reaches the minimum power threshold. In this example, the polarization detector 202, through the switch component 204, may again activate the previously turned OFF vertically polarized antenna elements 208 in order to come up with a new set of determined and compared wireless signal strengths. In other words, the polarization detector 202 may provide dynamic adjustment of polarization in the antenna array 206 during the wireless communication (e.g. mm-wave).

In other implementations, the polarization detector 202 may perform the determination and comparison of the wireless signal strengths after a particular period instead of using the minimum power threshold. Furthermore, the polarization detector 202 may select and utilize both horizontally and vertically polarized antenna elements 208, or it may select a portion of the horizontally or vertically polarized antenna elements 208. For example, the polarization detector 202 determines that the maximum signal strength is present at the horizontally polarized antenna elements of the first column in the 4×4 configuration. In this example, the polarization detector 202 may turn OFF the horizontally polarized antenna elements 208 in the rest of the columns in addition to turning OFF the vertically polarized antenna elements 208 that are receiving lesser wireless signal strength.

In another implementation, a power feedback control (not shown) from a base station may be utilized to select the antenna elements 208 to be utilized. For example, during signal transmission by the antenna 200 to the base station, the base station may send control signals that may indicate which elements 208 may be used for efficient wireless communications.

As an example of current implementations here, the transmission lines 110 may include a plurality of waveguides that couple the RF module 112 to the antenna array 206. For example, the transmission lines 110 are waveguides that resonates around 60 GHz for WiGig applications. In this example, the internal dimensions of the waveguides facilitate maximum power transfer of the wireless signal.

With continuing reference to FIG. 2, the RF module 112 may be configured to control transmission or reception of wireless signals (e.g., mm-wave). During transmission or reception, the RF module 112 may utilize different forms of digital modulation or demodulation, signal conversion methods, etc. to transmit or receive the mm-wave wireless signals. Furthermore, the RF module 112 may be integrated or assembled into the printed circuit board (PCB) of the portable device 102.

Although the antenna 200 may be fabricated in a single substrate, other implementations may separate the antenna elements 208 from the single substrate. Furthermore, the detection and measurement of the wireless signal strength may be implemented on each antenna element 208 rather than comparing the wireless signal strength between the antenna elements.

Figure 3:
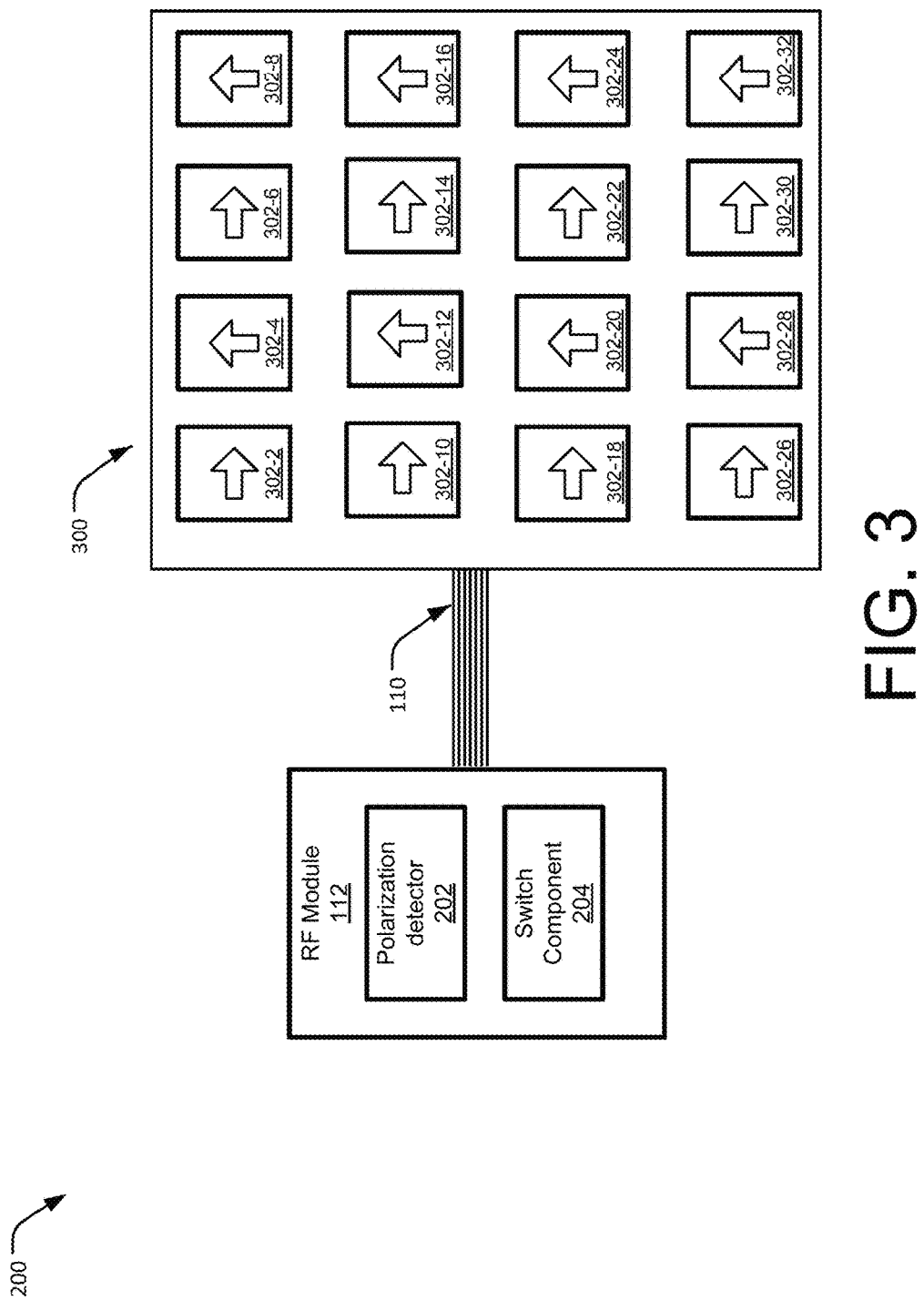
FIG. 3 is another implementation of an example antenna configuration as described in present implementations herein.

FIG. 3 illustrates another implementation of the example antenna 200 which is a representative antenna of the antennas 104 and 108 of the portable devices 102 and 106, respectively. In this example, the antenna 200 includes the RF module 112 with the polarization detector 202 and the switch components 204, the transmission lines 110, and an antenna array 300 with column-based interleaved antenna elements 302.

As an example of present implementations herein, the antenna array 300 is a 4×4 interleaved antenna array that includes a first column composing of horizontally polarized antenna element 302-2, 302-10, 302-18 and 302-26. In this example, the second column of the 4×4 interleaved antenna array includes vertically polarized antenna elements 302-4, 302-12, 302-20 and 302-28; and thereafter followed by a third column with similar configuration, and so on.

As discussed above, the polarization detector 202 may be configured to determine and compare the wireless signal strengths between the antenna elements. The same configuration and implementations as described in FIG. 2 may similarly apply to FIG. 3. That is, the polarization detector 202, in response to the determined and compared wireless signal strengths, may deactivate some or all of the horizontally or vertically polarized elements. In other implementations, the polarization detector 202 may utilize a combination of the horizontally and vertically polarized antenna elements to provide a circular polarization if the circular polarization is determined to provide the higher wireless signal strength during the LOS mm-wave wireless communication.

Although FIG. 3 illustrates another specific form of interleaving between the antenna elements 302, other geometrical configurations of the antenna elements 302 may apply the same principle as described above.

For example, an interleaving of the antenna elements 302 may include the horizontally polarized antenna elements 302-2, 302-10, 202-18, and 302-26 (in the first column) to be encircled/surrounded by the vertically polarized elements such as the vertically polarized antenna elements 302-4, 303-12, etc. In another example, a 2×2 horizontally polarized antenna elements are surrounded by 4×4 vertically polarized antenna elements in different directions or angles and so on. In these examples, the horizontally and vertically polarized antenna elements 302 may be further configured to include a particular geometrical dimension, rotation, size, angle, depth, planar position, etc. with respect to the other antenna element 302.

That is, for example, the physical relationships between the horizontally and vertically polarized elements 302 may not necessarily be perpendicular or form an exact 90 degree angle with each other as illustrated in FIG. 3. The relationship between the physical locations of the horizontally and vertically polarized antenna elements 302 may form a three-dimensional (3D) plane (not shown) rather than a two-dimensional (2D) plane.

Figure 4:
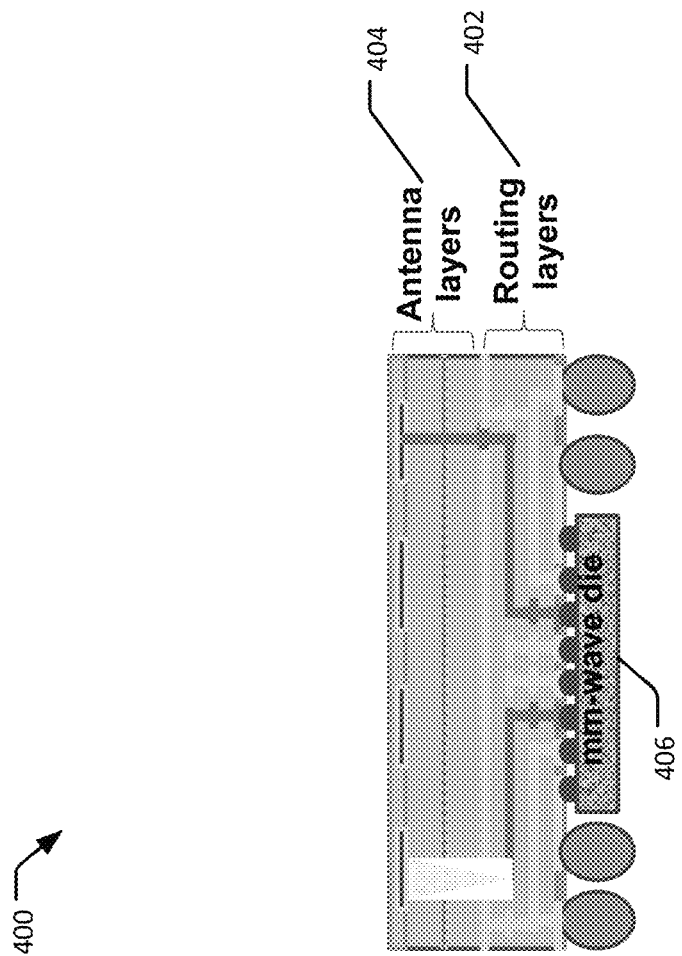
FIG. 4 is an example package implementation of a radio chip and antenna as described in present implementations herein.

FIG. 4 illustrates an implementation for packaging 400 a radio chip and antenna. For mm-wave frequencies, it may be desirable for antennas and a radio chip to be on the same package in order to reduce transmission losses. As discussed above, waveguides may be implemented to facilitate maximum power transfer of wireless signals. In this example, transmission lines may include a transmission line medium or routing layers 402 with antenna layers 404. The layers 402 and 404 may be fabricated using printed circuit board (PCB) technology or multilayer package substrate technology. In this example the layers 402 and 404 are fabricated on an mm-wave die 406.

Figure 5:
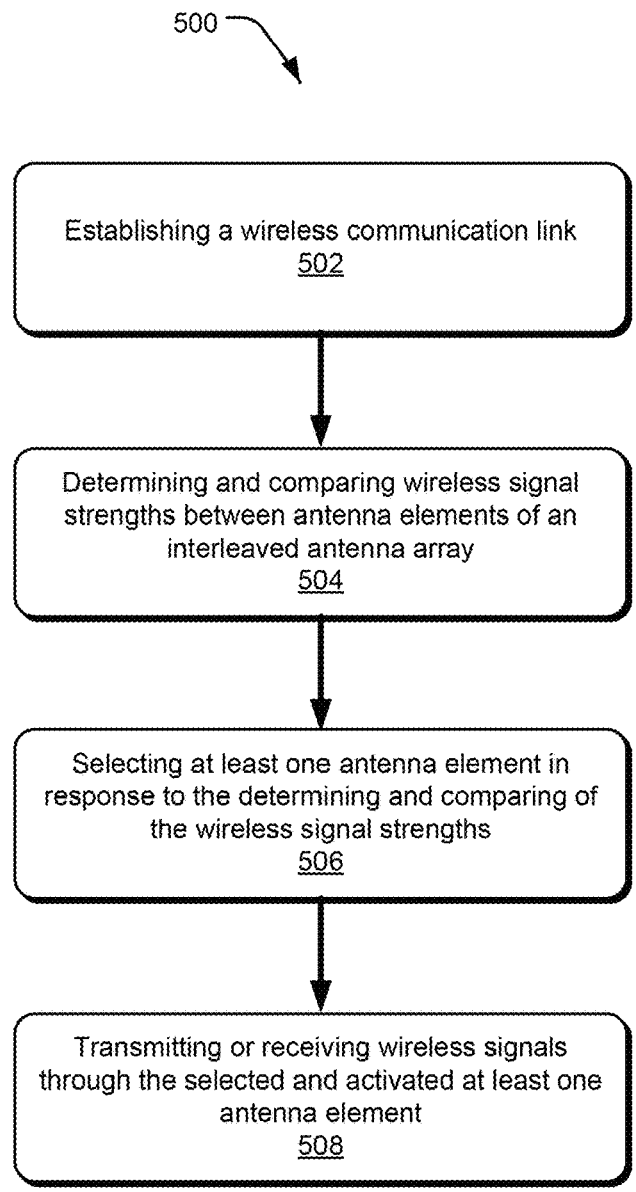
FIG. 5 is an example process chart illustrating an example method for implementing an antenna array with dynamic polarization adjustment in a portable device.

FIG. 5 shows an example process chart 500 illustrating an example method for implementing an antenna array with a dynamic polarization adjustment in a portable device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, establishing a wireless communication (e.g., a mm-wave) link is performed. For example, a portable device (e.g., portable device 102) detects an mm-wave wireless signal. In this example, the portable device 102 may establish the wireless communication link, for example, by sending a request-to-join an ad-hoc communication that may be initiated by another portable device (e.g., portable device 106).

At block 504, determining and comparing wireless signal strengths between antenna elements of an interleaved antenna array within the portable device is performed. For example, the antenna 200 for the portable device 102 includes the interleaved horizontally and vertically polarized antenna elements 208 that are used to establish the wireless communication link. In this example, the polarization detector 202 of the RF module 112 may be configured to detect and compare the wireless signal strengths between each of the horizontally and vertically polarized antenna elements 208.

At block 506, selecting the antenna element in response to the determined stronger wireless signal strength is performed. In the example above, the polarization detector 202 may select a portion or the plurality of horizontally polarized antenna elements 208, or the polarization detector 202 may select at least one of the vertically polarized antenna elements 208 in response to the determined wireless signal strengths between the antenna elements of the interleaved antenna array 206.

At block 508, transmitting or receiving mm-wave wireless signals through the selected antenna element is performed. For example, the portable device 102 through a RF module (e.g., RF module 112) may transmit or receive mm-wave wireless signals to or from the selected antenna elements 208. In this example, the switch components 204 are utilized by the RF module 112 when deactivating the non-selected antenna elements. To this end, power savings may be derived while the efficiency of the wireless communication link is not affected.

The following examples pertain to further embodiments:

Example 1 is a method that comprises establishing a wireless communication link through an antenna array that includes a plurality of horizontally and vertically polarized antenna elements; determining and comparing wireless signal strength between the plurality of horizontally and vertically polarized antenna elements; selecting at least one antenna element of the plurality of antenna elements in response to the determining and comparing of the wireless signal strength; and transmitting or receiving the wireless signal through the selected at least one antenna element.

In example 2, the method as recited in example 1, wherein the plurality of horizontally and vertically polarized antenna elements are interleaved to form a polarization-configuration that is based on a relationship between physical location of at least one horizontally polarized antenna element and at least one vertically polarized antenna element.

In example 3, the method as recited in example 1, wherein the determining and comparing of the wireless signal strength includes determining and comparing of a first wireless signal strength of the horizontally polarized antenna element to a second wireless signal strength of the vertically polarized antenna element.

In example 4, the method as recited in example 1, wherein the determining and comparing of the wireless signal strengths utilizes a gradient optimization algorithm to derive a desired antenna polarization.

In example 5, the method as recited in example 1, wherein the selecting includes deactivating non-selected antenna elements for power savings.

In example 6, the method as recited in example 1, further comprises comparing the wireless signal strength of the selected at least one antenna element to a power threshold, wherein the determining and comparing wireless signal strength between the horizontally and vertically polarized antenna elements are repeated in response to the wireless signal strength of the selected at least one antenna element that is below the power threshold.

In example 7, the method as recited in example 6, wherein the repeating of the determination and comparison of the wireless signal strengths includes turning ON of previously non-selected and deactivated antenna elements.

In example 2, the method as recited in any of examples 1-7, wherein the wireless communication link signal utilizes an mm-wave signal.

Example 9 is a device that comprises an antenna array that includes a plurality of horizontally and vertically polarized antenna elements; a radio-frequency (RF) module that facilitates transmission or reception of wireless signals through the antenna array, the RF module further comprising: a detector configured to determine and compare wireless signal strength between the plurality of horizontally and vertically polarized antenna elements; and a switch component that couples the plurality of antenna elements to the RF module, wherein the switch component couples selected plurality of antenna elements to the RF module in response to the determining and comparing of the wireless signal strength between the horizontally and vertically polarized antenna elements.

In example 10, the device as recited in example 9, wherein the determining and comparing of the wireless signal strengths include determining and comparing of a first wireless signal strength of at least one horizontally polarized antenna element to a second wireless signal strength of at least one vertically polarized antenna element.

In example 11, the device as recited in example 9, wherein the antenna array includes at least one horizontally polarized element that is surrounded by vertically polarized elements, or at least one vertically polarized element that is surrounded by the horizontally polarized elements.

In example 12, the device as recited in example 9, wherein the switch component is configured to deactivate non-selected antenna elements for power savings.

In example 13, the device as recited in example 9, wherein the polarization detector utilizes a gradient optimization algorithm to derive a desired antenna polarization.

In example 14, the device as recited in example 9, wherein the polarization detector is further configured to compare the wireless signal strength of the selected antenna to a power threshold, wherein the polarization detector repeats the determining and comparing wireless signal strengths in response to the compared wireless signal strength of the selected antenna that is below the power threshold.

In example 15, the device as recited in any of examples 9-14, wherein the transmission or reception of the wireless signals utilizes a millimeter-wave (mm-wave) signal.

In example 16, the device as recited in any of examples 9-14, wherein the horizontally and vertically polarized antenna elements are interleaved.

Example 17 is an antenna array that comprises a plurality of interleaved horizontally and vertically polarized antenna elements, wherein at least one antenna element is utilized during a signal reception or transmission in the antenna array based on a measurement or comparison of a wireless signal strength in at least one horizontally polarized antenna element, at least one vertically polarized antenna element, or a combination thereof.

In example 18, the antenna array as recited in example 17, wherein the interleaved plurality of horizontally and vertically polarized antenna elements form a polarization-configuration that is based on a relationship between physical locations of the at least one horizontally polarized antenna element and the at least one vertically polarized antenna element.

In example 19, the antenna array as recited in example 17, wherein on a measurement or comparison of the wireless signal strength is repeated when the wireless signal strength of a selected at least one antenna element falls below a power value.

In example 20, the antenna array as recited in any of examples 17-19, wherein the signal reception or transmission utilizes an mm-wave signal.

What is claimed is:

1. A method comprising:
   selecting an antenna polarization to select between a plurality of interleaved horizontally and vertically polarized antenna elements of an antenna array based on wireless signal strengths between the plurality of interleaved horizontally and vertically polarized antenna elements, the selection of the antenna polarization providing a selected plurality of horizontally polarized antenna elements or a selected plurality of vertically polarized antenna elements;
   selecting, based on the selected antenna polarization, at least one antenna element with a predetermined wireless signal strength from the provided selected plurality of horizontally or vertically polarized antenna elements to provide a sub-selected at least one antenna element;
   transmitting or receiving the wireless signal through the sub-selected at least one antenna element of the selected plurality of horizontally or vertically polarized antenna elements; and
   dynamically adjusting the antenna polarization and the selected at least one antenna element during the transmitting or receiving of the wireless signal based on the wireless signal strength.

2. The method of claim 1, wherein the plurality of interleaved horizontally and vertically polarized antenna elements forms a polarization-configuration that is based on a relationship between physical location of at least one horizontally polarized antenna element and at least one vertically polarized antenna element.

3. The method of claim 1, wherein the wireless communication link signal utilizes an mm-wave signal.

4. The method of claim 1, further comprising determining and comparing periodically the wireless signal strengths, wherein the determining and comparing includes determining and comparing of a first wireless signal strength of the horizontally polarized antenna element to a second wireless signal strength of the vertically polarized antenna element.

5. The method of claim 1, wherein the selecting an antenna polarization based on the wireless signal strengths utilizes a gradient optimization algorithm to derive a desired antenna polarization.

6. The method of claim 1, wherein the selecting includes deactivating non-selected antenna elements for power savings.

7. The method of claim 1, further comprising comparing the wireless signal strength of the selected at least one antenna element to a power threshold, wherein the selection of the antenna polarization is repeated in response to the wireless signal strength of the selected at least one antenna element that is below the power threshold.

8. The method of claim 7, wherein the repeating includes turning ON of previously non-selected and deactivated antenna elements.

9. The method of claim 1, wherein the antenna array comprises alternative columns of horizontally polarized antenna elements and vertically polarized antenna elements, wherein each column includes at least two antenna elements.

10. The method of claim 1, wherein the antenna array comprises a plurality of columns and rows of antenna elements, wherein each column includes alternating horizontally polarized antenna elements and vertically polarized antenna elements, and each row includes alternating horizontally polarized antenna elements and vertically polarized antenna elements.

11. A device comprising:
    an antenna array comprising a plurality of horizontally and vertically polarized antenna elements;
    a radio-frequency (RF) circuitry configured to transmit or receive wireless signals via the antenna array, the RF circuitry further comprising:
    a detector configured to:
      determine and compare periodically wireless signal strength between the plurality of horizontally and vertically polarized antenna elements,
      select an antenna polarization to select the plurality of horizontally polarized antenna elements or select the plurality of vertically polarized antenna elements based on a comparison of wireless signal strength between the plurality of horizontally and vertically polarized antenna elements,
      dynamically identify, based on the selected antenna polarization, at least one antenna element with a predetermined wireless signal strength from the selected plurality of horizontally or vertically polarized antenna elements to provide a dynamically identified at least one antenna element,
    select the at least one antenna element with the predetermined wireless signal strength from the selected plurality of horizontally or vertically polarized antenna elements for transmission or reception of the wireless signals, and
    dynamically adjust the antenna polarization and the selected at least one antenna element during the transmission or reception of the wireless signals based on the wireless signal strength.

12. The device of claim 11, wherein the transmission or reception of the wireless signals utilizes a millimeter-wave (mm-wave) signal.

13. The device of claim 11, wherein the comparing of the wireless signal strengths include comparing of a first wireless signal strength of at least one horizontally polarized antenna element to a second wireless signal strength of at least one vertically polarized antenna element.

14. The device of claim 11, wherein the antenna array includes at least one horizontally polarized element that is surrounded by vertically polarized elements, or at least one vertically polarized element that is surrounded by the horizontally polarized elements.

15. The device of claim 11, further comprising a switch configured to deactivate non-selected antenna elements for power savings.

16. The device of claim 11, wherein the polarization detector utilizes a gradient optimization algorithm to derive a desired antenna polarization.

17. The device of claim 11, wherein the polarization detector is further configured to compare the wireless signal strength of the selected antenna to a power threshold, wherein the polarization detector repeats the determining and comparing wireless signal strengths in response to the compared wireless signal strength of the selected antenna that is below the power threshold.

18. The device of claim 11, wherein the horizontally and vertically polarized antenna elements are interleaved.

19. An antenna array comprising:
    a plurality of interleaved horizontally and vertically polarized antenna elements, wherein at least one antenna element is selected and utilized during a signal reception or transmission in the antenna array, wherein the selection of the at least one antenna element includes:

a comparison of a wireless signal strengths between the horizontally and vertically polarized antenna elements;

selection of an antenna polarization to select either the plurality of horizontally or vertically polarized antenna elements based on the periodic comparison;

a dynamic sub-selection, based on the selected antenna polarization, of the at least one antenna element with a predetermined wireless signal strength from the selected plurality of horizontally or vertically polarized antenna elements to provide a dynamically sub-selected at least one antenna element; and dynamically adjusting the antenna polarization and the selected at least one antenna element, during the signal reception or transmission, based on the wireless signal strength.

20. The antenna array of claim 19, wherein the interleaved plurality of horizontally and vertically polarized antenna elements form a polarization-configuration that is based on a relationship between physical locations of the at least one horizontally polarized antenna element and the at least one vertically polarized antenna element.

21. The antenna array of claim 19, wherein the signal reception or transmission utilizes an mm-wave signal.

22. The antenna array of claim 19, wherein the comparison of the wireless signal strength is repeated when the wireless signal strength of a selected at least one antenna element falls below a power value.

* * * * *